United States Patent
Kintzley et al.

(10) Patent No.: US 8,418,061 B2
(45) Date of Patent: Apr. 9, 2013

(54) DYNAMIC MACRO CREATION USING HISTORY OF OPERATIONS

(75) Inventors: Randy A. Kintzley, Novato, CA (US); Hans-Frederick Brown, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 581 days.

(21) Appl. No.: 12/426,474

(22) Filed: Apr. 20, 2009

(65) Prior Publication Data

US 2010/0269041 A1    Oct. 21, 2010

(51) Int. Cl.
*G06F 3/00* (2006.01)
*G06F 3/048* (2006.01)

(52) U.S. Cl. ........ 715/704; 715/700; 715/731; 715/764; 715/783; 715/810; 715/835; 715/845

(58) Field of Classification Search ............ 715/704, 715/700, 731, 764, 783, 810, 835, 845
See application file for complete search history.

(56) References Cited

U.S. PATENT DOCUMENTS

| | | | |
|---|---|---|---|
| 5,070,534 A | | 12/1991 | Lascelles et al. |
| 5,621,877 A | * | 4/1997 | Neumann et al. ............. 715/723 |
| 5,867,163 A | | 2/1999 | Kurtenbach |
| 6,108,668 A | * | 8/2000 | Bates et al. ........................ 1/1 |
| 6,111,575 A | * | 8/2000 | Martinez et al. ............... 715/810 |
| 6,208,341 B1 | * | 3/2001 | van Ee et al. .................. 715/716 |
| 6,434,629 B1 | * | 8/2002 | Stearns et al. ................. 719/320 |
| 6,466,240 B1 | | 10/2002 | Maslov |
| 6,608,623 B1 | * | 8/2003 | Gerlovin et al. .............. 345/419 |
| 6,912,692 B1 | * | 6/2005 | Pappas .......................... 715/762 |
| 2001/0049704 A1 | * | 12/2001 | Hamburg et al. ............. 707/530 |
| 2006/0053126 A1 | * | 3/2006 | Baca et al. ..................... 707/100 |
| 2009/0044110 A1 | | 2/2009 | McLean |
| 2009/0103769 A1 | | 4/2009 | Milov et al. |
| 2009/0172533 A1 | | 7/2009 | Hamzaoui et al. |

OTHER PUBLICATIONS

U.S. Appl. No. 12/040,679, filed Feb. 29, 2008.

* cited by examiner

*Primary Examiner* — Kieu Vu
*Assistant Examiner* — Eric J Bycer
(74) *Attorney, Agent, or Firm* — Gates & Cooper LLP

(57) ABSTRACT

A computer implemented method, apparatus, and computer readable storage medium provide the ability to perform a series of steps in a graphics drawing application. A drawing is opened and a series of two or more drawing operations is performed. Subsequent to the performing, the series of the two or more drawing operations is displayed in a history list of drawing operations. An arbitrary subset of the two or more drawing operations is selected from anywhere in the history list. The selecting provides for the recording of the arbitrary selected subset. The recorded arbitrary subset of drawing operations is dynamically performed.

21 Claims, 6 Drawing Sheets

DYNAMIC MACRO CREATION USING HISTORY OF OPERATIONS

CROSS-REFERENCE TO RELATED APPLICATIONS

This application is related to the following co-pending and commonly-assigned patent application, which application is incorporated by reference herein:

U.S. patent application Ser. No. 12/040,679, entitled "DYNAMIC ACTION RECORDER", by Randy Kintzley and Hans-Frederick Brown, et. al., filed on Feb. 29, 2008.

BACKGROUND OF THE INVENTION

1. Field of the Invention

The present invention relates generally to macros, and in particular, to a method, apparatus, and article of manufacture for dynamically recording and creating a macro using a history of operations.

2. Description of the Related Art

Users often repeat a series of steps in the course of a computer project (e.g., drawing project, word processing project, etc.). Repeating the same set of steps over and over again is time consuming and often error prone due to the amount of interaction. Recording a series of steps and reusing the recording is a much more efficient way of achieving the same goal. Such a recording is commonly referred to as a "macro". As used herein, a macro refers to a series of user commands, actions, or keystrokes that have been recorded. To create a macro, a user must plan ahead, initiate a macro recording session, perform various steps, stop the recording, and assign a name to the macro. Such a series of steps is time consuming and requires advance planning by the user. Such problems may be better understood with a more detailed explanation of prior art macros.

In a computer drawing environment, a user might perform a series of steps and afterwards realize that he/she desires to repeat that same series of steps one or more times. However, the prior art would require the user to manually repeat the steps over again. Further, if the user wanted to perform the steps more than once and/or store the series of steps, he/she must plan in advance to record a macro and complete the macro creation and recording process. For example, suppose a user creates a circle, draws a square to enclose the circle and then rotates both ninety (90) degrees. Thereafter, the user realizes that the same shape should be repeated three more times. The user must activate a menu to create a macro, being the recording process, draw the circle again, drawn the square enclosing the circle again, rotate both 90 degrees, stop the recording, and create a name for the macro. Such a series of steps not only requires advance planning but also consumes additional time and memory to merely repeat a series of steps.

Accordingly, what is needed is a method, apparatus, and article of manufacture for repeating a series of steps in a dynamic, flexible, reliable, and consistent manner without advance planning.

SUMMARY OF THE INVENTION

To overcome the problems of the prior art, one or more embodiments of the invention present a method, apparatus, and article of manufacture for performing/replaying a series of steps in a graphics drawing application. A history window displays a tree view of all operations performed during an editing session of a graphics drawing application. The window allows the user to easily select one or more of the displayed operations and replay them without the need for advanced planning and without initiating a macro recording session.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention may also be referred to as a dynamic macro creation using a history of operations. The invention is dynamic because the actions are recorded and configured dynamically by the user without any programming capability or knowledge on behalf of the user. Further, the invention is dynamic because the user may repeat the performance of selected steps without advance planning merely be selecting the desired steps to repeat and opting to either store such steps in a macro or playback the steps.

Hardware and Software Environment

Figure 1:
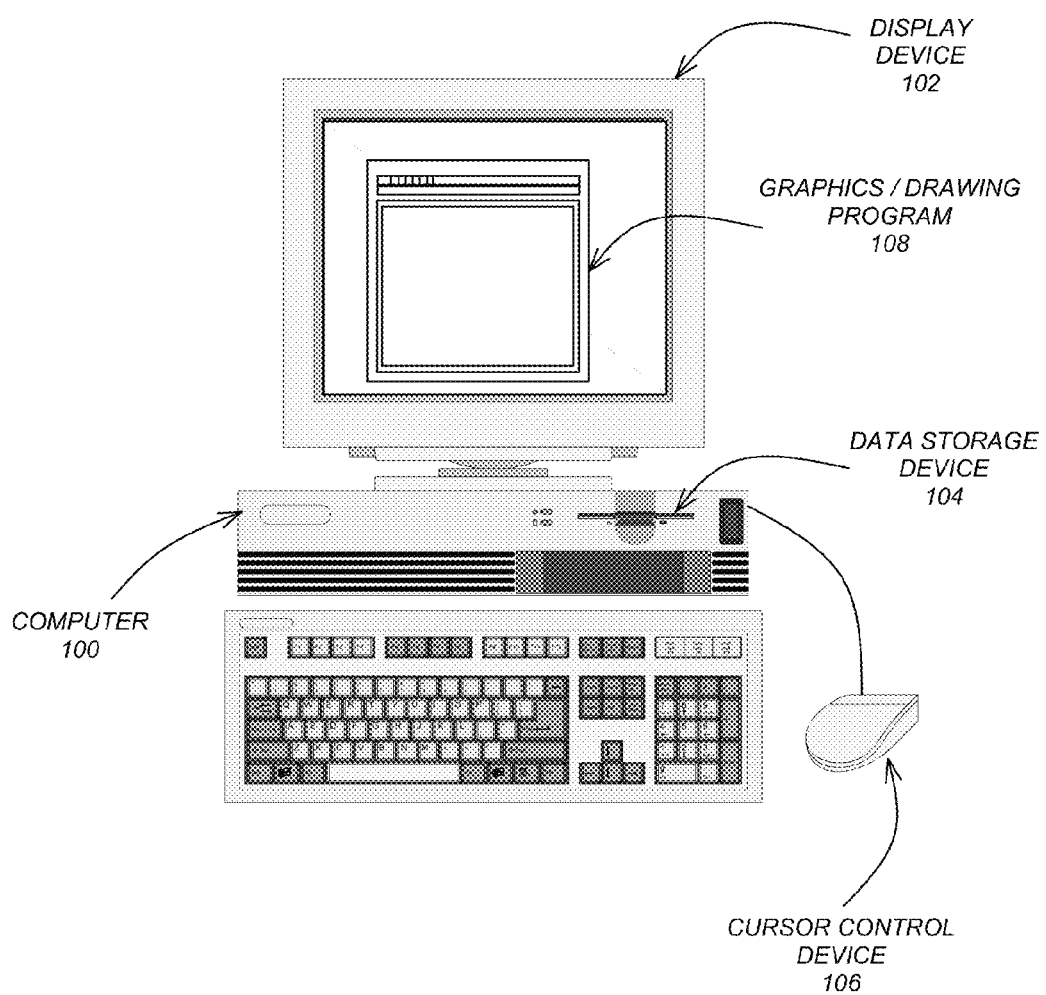
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Alternatively, embodiments of the invention may be implemented in any type of program 108 that utilizes macros including but not limited to graphics programs, word processing applications, spreadsheets, etc. Further, embodiments of the invention may also be implemented in plug-ins or modules that are utilized in conjunction with other programs (e.g., a paint or drawing program within a word processing application). Generally, the program (graphics or otherwise) 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

In one or more embodiments, instructions implementing the program 108 are tangibly embodied in a computer-readable medium, e.g., data storage device 104, which could include one or more fixed or removable data storage devices, such as a ZIP™ drive, floppy disc drive, hard drive, CD-ROM drive, tape drive, etc. Further, the program 108 is comprised of instructions which, when read and executed by the computer 100, causes the computer 100 to perform the steps necessary to implement and/or use the present invention. Program 108 and/or operating instructions may also be tangibly embodied in a memory and/or data communications devices of computer 100, thereby making a computer program product or article of manufacture according to the invention. As such, the terms "article of manufacture" and "computer program product" as used herein are intended to encompass a computer program accessible from any computer readable device or media.

Further, as used herein, a computer readable storage medium encompasses a computer readable storage medium encoded with computer program instructions which when accessed by a computer cause the computer to load the program instructions to a memory therein creating a special purpose data structure causing the computer to operate as a specially programmed computer that executes a method of the invention.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
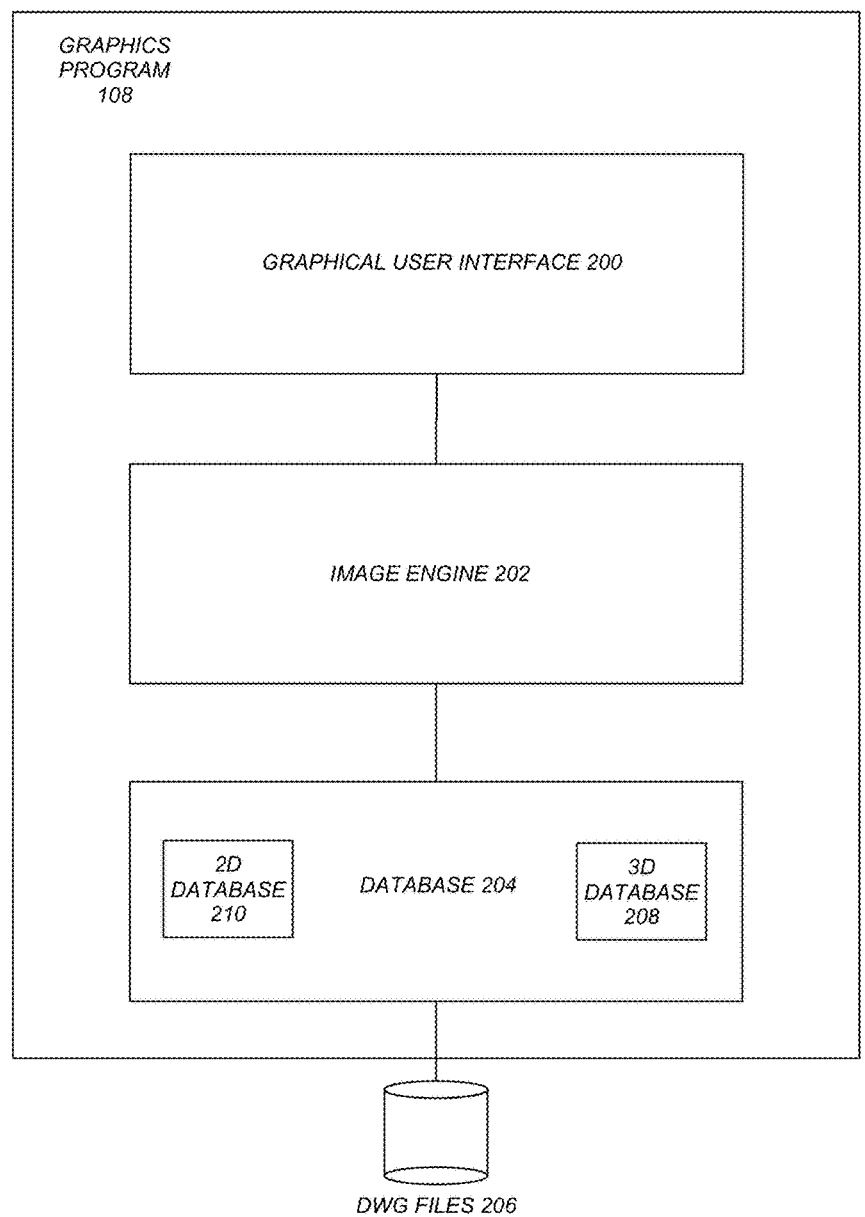
FIG. 2 is a block diagram that illustrates the components of a graphics program in accordance with one or more embodiments of the invention.

FIG. 2 is a block diagram that illustrates the components of a graphics program 108 in accordance with one or more embodiments of the invention. There are three main components to a graphics program 108, including: a Graphical User Interface (GUI) 200, an Image Engine (IME) 202, and a DataBase (DB) 204 for storing objects in Drawing (DWG) files 206.

The Graphical User Interface 200 displays information to the operator and provides the functionality for the operator's interaction with the graphics program 108.

The Image Engine 202 processes the DWG files 206 and delivers the resulting graphics to the monitor 102 for display. In one or more embodiments, the Image Engine 202 provides a complete application programming interface (API) that allows other computer programs to interface to the graphics program 108 as needed.

The Database 204 is comprised of two separate types of databases: (1) a 3D database 208 known as the "3D world space" that stores 3D information; and (2) one or more 2D databases 210 known as the "2D view ports" that stores 2D information derived from the 3D information.

Software Embodiment Details

Figure 3:
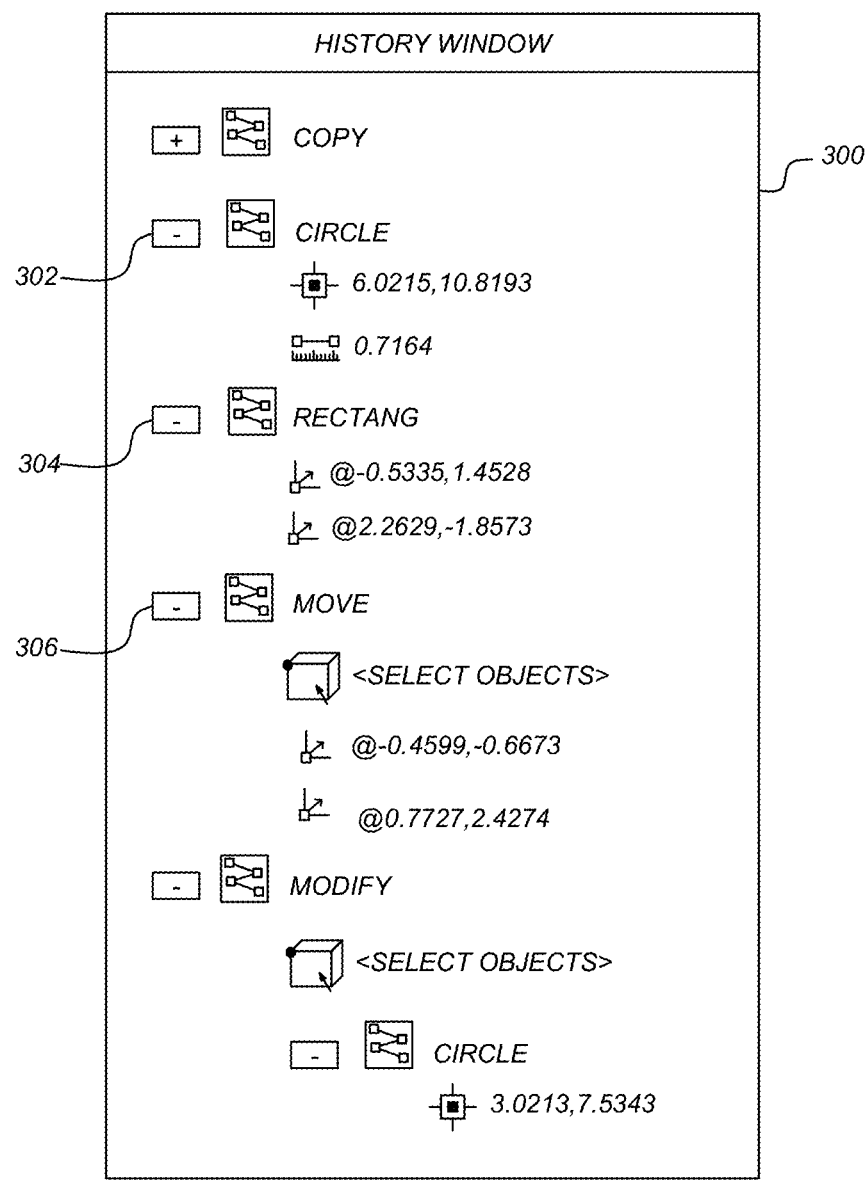
FIG. 3 illustrates a history window that displays a tree view of all operations performed in a current editing session in accordance with one or more embodiments of the invention.

One or more embodiments of the invention are implemented in a program 108 (graphics or otherwise) and present key innovations that provide a capability to dynamically, on-the-fly repeat a series of already performed steps while also opting to record such steps without pre-planning. FIG. 3 illustrates a history window (displayed by program 108) that displays a tree view of all operations performed in a current editing session in accordance with one or more embodiments of the invention. The window 300 allows the user to easily select one or more previous operations and replay them without the need to plan it out and record it first.

As described above, users often realize, after a series of operations are completed, that they need to repeat the sequence several more times. The history window offers a quick and easy way to repeat the desired operations without the need to first start recording, repeat the steps manually, and then stop recording. Instead, the user can simply select the desired operation(s), right-click (e.g., a mouse button or by selecting a menu option) and choose "play". There is no pre-planning required. If the operations are likely to be useful in the future, the user can also choose to save a portion of the history sequence as a formal named macro that can then be used in other drawings and other sessions of the program 108.

Such embodiments saves the customer time by removing the need for pre-planning a recording. It also eliminates steps and file management when a temporary macro is needed. When a series of operations are needed only temporarily, the user can simply access the history window and repeat as needed until done. There is no requirement to provide a macro name and save the sequence to a file. This saves time and allows the user to focus on the task at hand rather than the tools used to accomplish the task. It also eliminates the need to delete the macro file when it is no longer useful.

Referring again to FIG. 3, the user can select a subset of the commands/operations performed during the current session of program 108. Thus, user input is received (e.g., via keyboard controls or a mouse controlled cursor) that selects one or more of the operations in window 300. For example, the circle 302, rectangle 304, and move 306 commands can be selected by the user. Thereafter, further input may be received (e.g., a right click or selection of a menu/keyboard option) that causes the computer to replay the selected commands. Accordingly, if commands 302-306 were selected, the computer would replay steps 302-306 providing for (1) drawing with a circle with a center at the specified location (i.e., 6.0125,10.8193) and having a radius of 0.7164, (2) drawing a rectangle with one corner at (−0.5335,1.4528) and another corner at (2.2629,−1.8573), and (3) the movement of selected objects where input selects certain objects and then moves them a specified distance.

As illustrated in FIG. 3, the history window displays the operations from the current session in a hierarchical manner. One or more commands may be selected and either played or saved into a macro.

Logical Flow

Figure 4:
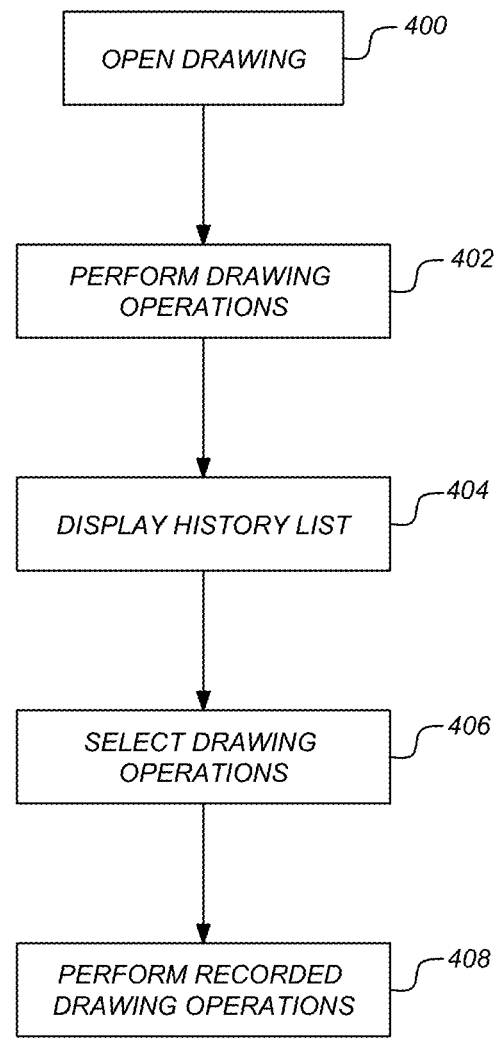
FIG. 4 is a flow chart illustrating the logical flow for performing a series of steps in a graphics drawing application in accordance with one or more embodiments of the invention.

FIG. 4 is a flow chart illustrating the logical flow for performing a series of steps in a graphics drawing application in accordance with one or more embodiments of the invention.

At step 400, a first drawing is opened in the graphics drawing application (e.g., using a computer and processor, specially programmed or otherwise).

At step 402, a series of two or more (or alternatively three or more) drawing operations are performed in the drawing application. Such drawing operations may consists of geometric operations performed while editing entities within a drawing.

Subsequent to the performance of the operations, at step 404, the series of two or more drawing operations are displayed in a history list of drawing operations. Such a history list can be in a window or tab of a window (e.g., a dialog box or a window with menu options, etc.) Such a window may also be readily available or always displayed as a user works in a drawing. The list itself may consist of a hierarchical tree structure with (or without) nested operations sorted in the tree structure. The sorting may be based on order of performance, type of operation, etc. Further the history list may consist of a history of those drawing operations performed during a current session of the graphics drawing application. In other words, the operations are stored in cache or RAM (random access memory) during the session of the application but such operations may be lost once the session is closed.

It should be noted that since the history is displayed subsequent to the performance of the drawing operations, the user does not need to plan ahead or anticipate the need or desire to view the history. The user does not need to activate or initiate a macro recording sequence. As used herein, such a history is therefore obtained independently from, separately from, autonomously from, and not as part of any macro recording operation. Further, such a history is obtained without user interaction.

Figure 5A:
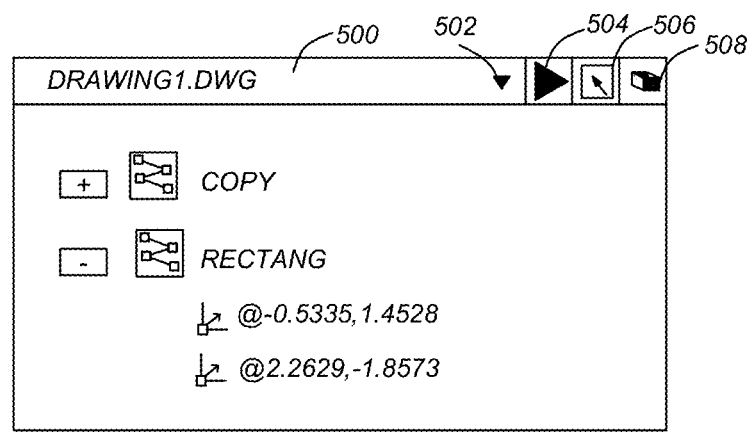
FIGS. 5A and 5B illustrate the effect of using different filters to view the history list of drawing operations for a single drawing and for all drawings in accordance with one or more embodiments of the invention.
Figure 5B:
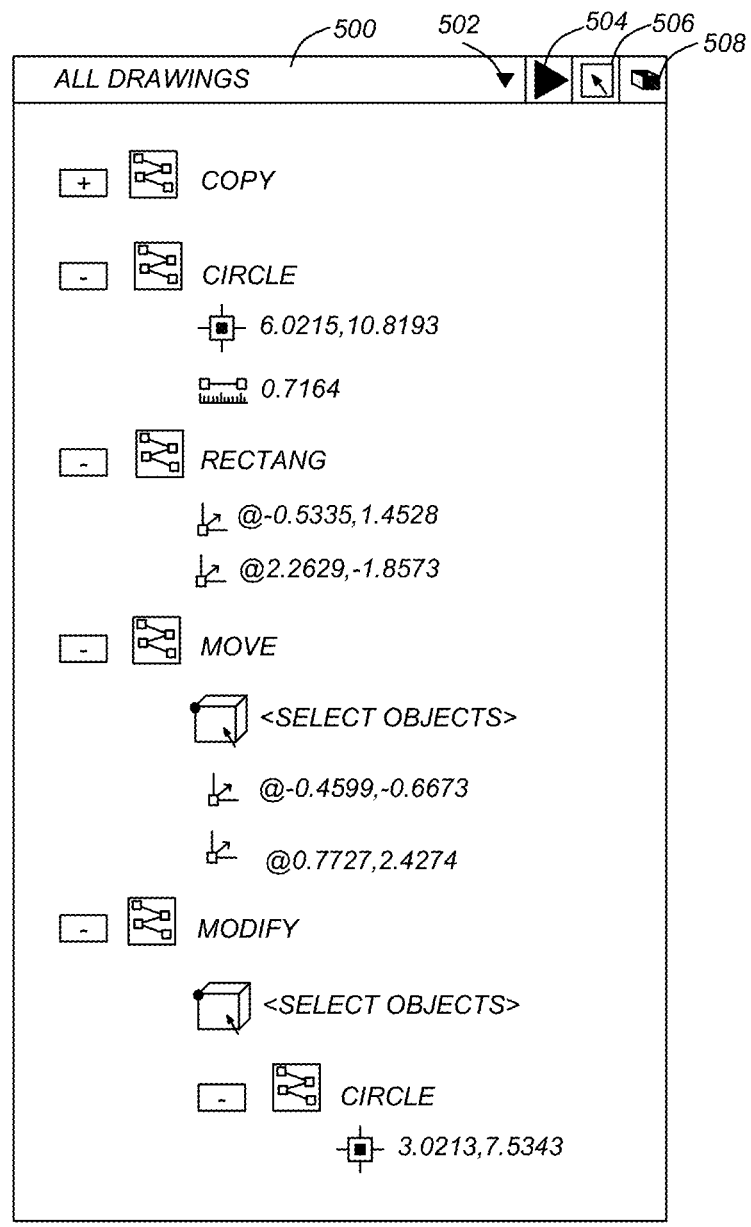

The display of the series of two or more drawing operations in the history list may also be filtered. For example, the user can select to view just those drawing operations performed in the current drawing being viewed. Alternatively, the user can select to view all drawing operations across all drawings from the current drawing application session. FIGS. 5A and 5B illustrate the effect of using different filters to view the history list of drawing operations for a single drawing and for all drawings in accordance with one or more embodiments of the invention. In FIG. 5A, the user has selected to filter the history list of drawing operations by selecting "DRAWING1.DWG" in the combo box 500 using the combo box selector 502. In FIG. 5B, the user has select to tilter the history list of drawing operations by selecting "ALL DRAWINGS" using drop down selector 502. Consequently, FIG. 5B shows the complete history of all drawing operations performed across all drawings in the current session of the drawing application.

By default, the drawing selected for the history list of operations is always synchronized with the current drawing being edited by the user. Embodiments of the invention may indicate such a relationship by adding "Current Drawing" to the combo-box 500. If the history list for the current drawing is not displayed, the text "Current Drawing" is not displayed as illustrated in FIG. 5A. The user can click on the combo-box 500 or comb-box selector 502 to see the history for all of the open drawings of the current session (e.g., as illustrated in FIG. 5B) or to select a particular drawing to filter the history list. The combo-box 500 may also always have the current drawing at the top of the list. In addition, if the user elects to play a selected operation, it will execute in the currently active drawing regardless of which list of drawing operations is being viewed. Accordingly, the displaying step 406 further includes accepting user input that filters the series of the two or more drawing operations to those drawing operations for a specified set of one or more drawings active in the graphics drawing application (e.g., one or more specific drawings or all of the drawings).

In both FIGS. 5A and 5B, the user can opt to simply play a selected set of drawing operations using play icon/button 504. Icon 506 provides a toggle button that indicates that if a selection of objects (within the actual drawing) is active, and a selected set of the history list of operations is played, then the selection set in the history list of operations is replaced with the active selection within the actual drawing. In other words, when the toggle 506 is active, any features of the drawing used by the operations in the history list are replaced by the active selections in the active drawing (i.e., the objects originally used when performing the operation are replaced with the currently selected objects in the active drawing). Such a feature provides the ability to playback history on a set of objects currently selected instead of the objects that were initially captured when the history was recorded. Icon 508 provides the ability to create/save a macro based on the selection of operations in the history list of operations (as described above).

At step 406, an arbitrary subset of the drawing operations is selected from anywhere in the history list. Such a selection is in direct response to input from a user (e.g., using a keyboard, mouse, cursor control device, etc.). As noted herein, the selecting itself serves to record the subset of drawing operations for subsequent action. While the selection itself does not provide for any persistent storage, the selection serves to record those selected steps so that they can be performed/replayed as desired. The subset of operations may consist of one, two, or more steps from the history list. Further, the selection is arbitrary from anywhere in the history list. In this regard, the selected subset does not need to include the most recently executed operation (from this or another drawing). Instead, a selection of operations from the middle of the history list may be performed.

Further, the arbitrarily selected subset may or may not include consecutively executed operations. In this regard, multiple different operations that were not performed consecutively may also be selected. For example, suppose a user performs three (5) consecutive/sequential operations including (1) drawing a circle, (2) drawing a square, (3) drawing a diamond, (4) drawing an ellipse, and (5) drawing a rectangle (performed in sequential order 1-5). The user may subsequently select one or more of the following subsets: (a) operations 1-4; (b) 1 and 3, (c) operations 2 and 3; (d) operations 2 and 4, etc. In other words, the order in which the consecutive nature in which the operations were performed and the most recently performed operation are not constraints on the arbitrary selection process.

At step 408, the recorded subset of drawing operations are dynamically performed/replayed. Such a dynamic performance can be triggered by the user activating a right mouse button and selecting the appropriate menu option. Alternatively, a keyboard control or other method may be used to activate the performance/replay of the steps.

Further, the performance of the drawing operations is not limited to performing the steps in a second different drawing from which the operations were originally performed. Instead, the selected subset of drawing operations may be performed in the same first drawing. Such a repeated sequence of drawing operations may be performed in the same location as previously set forth or may take into account newly selected parameters/attributes. For example, a user can first click the mouse to identify a different location in the drawing followed by the execution of a selected set of drawing operations (e.g., drawing a circle and square). Embodiments of the invention may take the newly identified mouse click location to commence the selected set of drawing operations (e.g., the new mouse click location may serve as the center of the circle or a corner of the square).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for performing a series of steps in a graphics drawing application:
   opening a first drawing in the graphics drawing application;
   performing two or more drawing operations in the first drawing in the graphics drawing application;
   subsequent to the performing, displaying the two or more performed drawing operations in a history list of drawing operations;
   dynamically selecting an arbitrary subset of drawing operations from anywhere in the history list of performed drawing operations;
   accepting user input, via user selection of a user interface control, to dynamically replay the selected arbitrary subset of performed drawing operations; and
   in response to the user input, dynamically repeatedly reperforming the selected arbitrary subset of performed drawing operations in the first drawing without creating a macro of the selected arbitrary subset of performed drawing operations prior to the repeatedly reperforming.

2. The method of claim 1, wherein the history list of performed drawing operations comprises a hierarchical tree structure.

3. The method of claim 1, further comprising storing the selected arbitrary subset of dynamically repeatedly reperfomed drawing operations as a macro after the repeated reperforming is concluded.

4. The method of claim 1, wherein each of the two or more performed drawing operations comprise geometric operations performed while editing entities within the first drawing.

5. The method of claim 1, wherein the user input comprises a user selecting an option from clicking a mouse button.

6. The method of claim 1, wherein the displaying the two or more performed drawing operations comprises accepting user input that filters the two or more performed drawing operations to those performed drawing operations for a specified set of one or more drawings active in the graphics drawing application.

7. The method of claim 1, further comprising:
   activating, by toggling, a selection option;
   based on the activating, during the dynamically repeatedly reperforming, replacing a selection set in the history list of drawing operations with an active selection in the first drawing.

8. An apparatus for performing a series of steps in a graphics drawing application in a computer system comprising:
   (a) a computer having a memory and a processor;
   (b) an application executed by the processor using the memory, wherein the application is configured to:
      (i) open a first drawing in the graphics drawing application;
      (ii) perform two or more drawing operations in the graphics drawing application;
      (iii) subsequent to the performance of the two or more performed drawing operations, display the two or more performed drawing operations in a history list of drawing operations;
      (iv) dynamically select an arbitrary subset of the drawing operations from anywhere in the history list of performed drawing operations;
      (v) accept user input, via user selection of a user interface control, to dynamically replay the selected arbitrary subset of performed drawing operations; and
      (vi) in response to the user input, dynamically repeatedly reperforming the selected arbitrary subset of performed drawing operations in the first drawing without creating a macro of the selected arbitrary subset of performed drawing operations prior to the repeatedly reperforming.

9. The apparatus of claim 8, wherein the history list of performed drawing operations comprises a hierarchical tree structure.

10. The apparatus of claim 8, wherein the application is further configured to store the selected arbitrary subset of dynamically repeatedly reperfomed drawing operations as a macro after the repeated reperforming is concluded.

11. The apparatus of claim 8, wherein each of the two or more performed drawing operations comprise geometric operations performed while editing entities within the first drawing.

12. The apparatus of claim 8, wherein the user input comprises a user selecting an option from clicking a mouse button.

13. The apparatus of claim 8, wherein the application is configured to display the two or more performed drawing operations by further accepting user input that filters the two or more performed drawing operations to those performed drawing operations for a specified set of one or more drawings active in the graphics drawing application.

14. The apparatus of claim 8, wherein the application is further configured to
   activate, by toggling, a selection option;
   based on the activating, during the dynamically repeatedly reperforming, replace a selection set in the history list of drawing operations with an active selection in the first drawing.

15. A computer readable storage medium encoded with computer program instructions which when accessed by a computer cause the computer to load the program instructions to a memory therein create a special purpose data structure causing the computer to operate as a specially programmed computer that executes a method for performing a series of steps in a graphics drawing application:
   opening, using the specially programmed computer, a first drawing in the graphics drawing application;
   performing, using the specially programmed computer, two or more drawing operations in the first drawing in the graphics drawing application;
   subsequent to the performing, displaying, using the specially programmed computer, the two or more performed drawing operations in a history list of drawing operations;
   dynamically selecting using the specially programmed computer, an arbitrary subset of drawing operations from anywhere in the history list of performed drawing operations;
   accepting user input, via user selection of a user interface control, to dynamically replay the selected arbitrary subset of performed drawing operations; and
   in response to the user input, dynamically repeatedly reperforming, using the specially programmed computer, the selected arbitrary subset of performed drawing operations in the first drawing without creating a macro of the selected arbitrary subset of performed drawing operations prior to the repeatedly reperforming.

16. The computer readable storage medium of claim 15, wherein the history list of performed drawing operations comprises a hierarchical tree structure.

17. The computer readable storage medium of claim 15, further comprising storing, using the specially programmed computer, the selected arbitrary subset of dynamically repeatedly reperformed drawing operations as a macro after the repeated reperforming is concluded.

18. The computer readable storage medium of claim 15, wherein each of the two or more performed drawing operations comprise geometric operations performed while editing entities within the first drawing.

19. The computer readable storage medium of claim 15, wherein the user input comprises a user selecting an option from clicking a mouse button.

20. The computer readable storage medium of claim 15, wherein the displaying of the two or more performed drawing operations comprises accepting user input that filters the two or more performed drawing operations to those performed drawing operations for a specified set of one or more drawings active in the graphics drawing application.

21. The computer readable storage medium of claim 15, further comprising:
   activating, by toggling, a selection option;
   based on the activating, during the dynamically repeatedly reperforming, replacing a selection set in the history list of drawing operations with an active selection in the first drawing.

* * * * *